US012647179B2

(12) United States Patent
Reuche et al.

(10) Patent No.: US 12,647,179 B2
(45) Date of Patent: Jun. 2, 2026

(54) METHOD FOR MANAGING AN OPERATING FAULT IN A LASER DIODE

(71) Applicant: SAGEMCOM BROADBAND SAS, Bois-Colombes (FR)

(72) Inventors: Anthony Reuche, Bois-Colombes (FR); Jean-Philippe Jaulin, Bois-Colombes (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 77 days.

(21) Appl. No.: 18/736,129

(22) Filed: Jun. 6, 2024

(65) Prior Publication Data

US 2024/0413899 A1 Dec. 12, 2024

(51) Int. Cl.
*H04B 10/03* (2013.01)
*H04Q 11/00* (2006.01)

(52) U.S. Cl.
CPC ......... *H04B 10/03* (2013.01); *H04Q 11/0067* (2013.01)

(58) Field of Classification Search
CPC ...... H04B 10/03; H04B 10/272; H04B 10/07; H04B 10/27; H04B 10/0793; H04B 10/07955; H04B 10/0731; H04B 10/0795; H04B 10/038; H04Q 11/0067; H04Q 2011/0043; H04Q 2011/0081; H04Q 2011/0083; H04Q 2011/0084
See application file for complete search history.

(56) References Cited

U.S. PATENT DOCUMENTS 8,582,969 B1 * 11/2013 Sandstrom ........... H04B 10/272
398/195
2014/0233940 A1 8/2014 Pitzer
2017/0279525 A1 * 9/2017 Qu ..................... H04B 10/0731

FOREIGN PATENT DOCUMENTS

CN 107947851 A 4/2018
EP 3998717 A1 5/2022

OTHER PUBLICATIONS

Jan. 18, 2024 Search Report issued in French Patent Application No. 230582.

* cited by examiner

*Primary Examiner* — Hibret A Woldekidan
(74) *Attorney, Agent, or Firm* — Williams Mullen; R. Brian Drozd

(57) ABSTRACT

A method and a device is provided for managing an operating fault in a laser diode of an optical interface of user equipment of the ONU type. The user equipment is connected by an optical access network of the passive optical network PON type to line termination equipment of the OLT type. The user equipment is enabled to send an optical signal during a time slot allocated to the user equipment in accordance with a time-division multiple access principle. The laser diode is checked as to whether it is transmitting an optical signal outside the allocated time slot and, if so, a message to the line termination equipment is transferred if the fault is detected, deactivation of the laser diode is demanded, and one or more procedures for attempting to correct the fault are implemented.

7 Claims, 6 Drawing Sheets

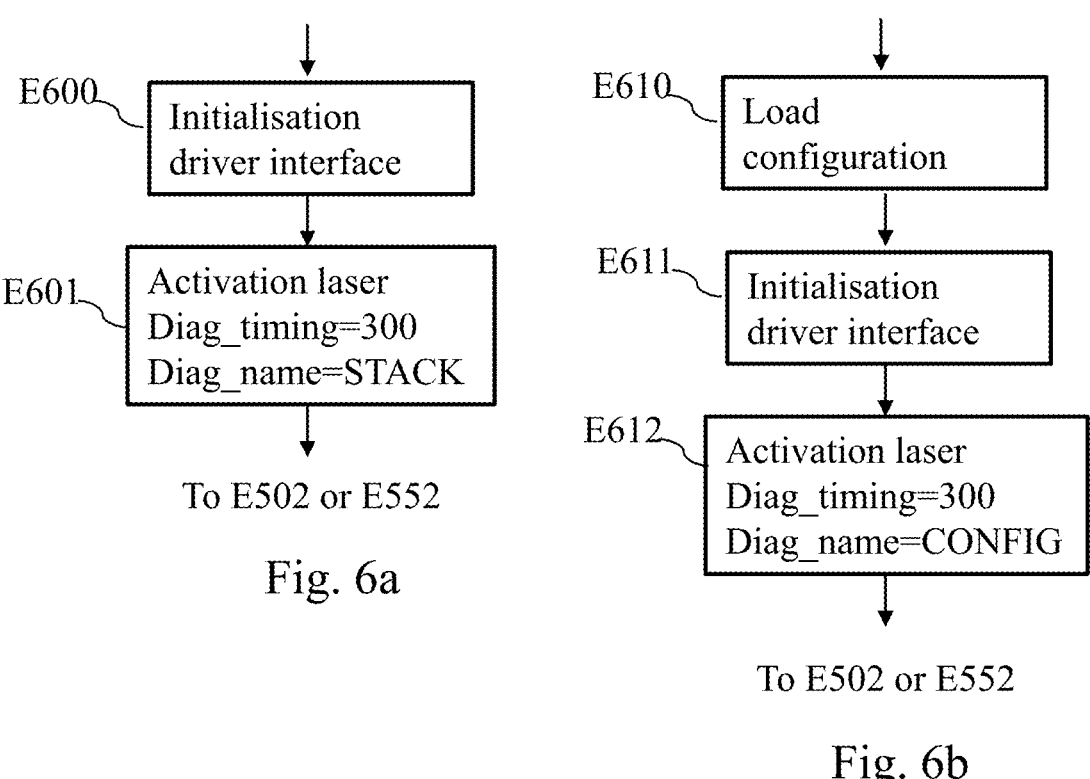
E600 — Initialisation driver interface
E601 — Activation laser
Diag_timing=300
Diag_name=STACK
To E502 or E552
Fig. 6a
E610 — Load configuration
E611 — Initialisation driver interface
E612 — Activation laser
Diag_timing=300
Diag_name=CONFIG
To E502 or E552
Fig. 6b
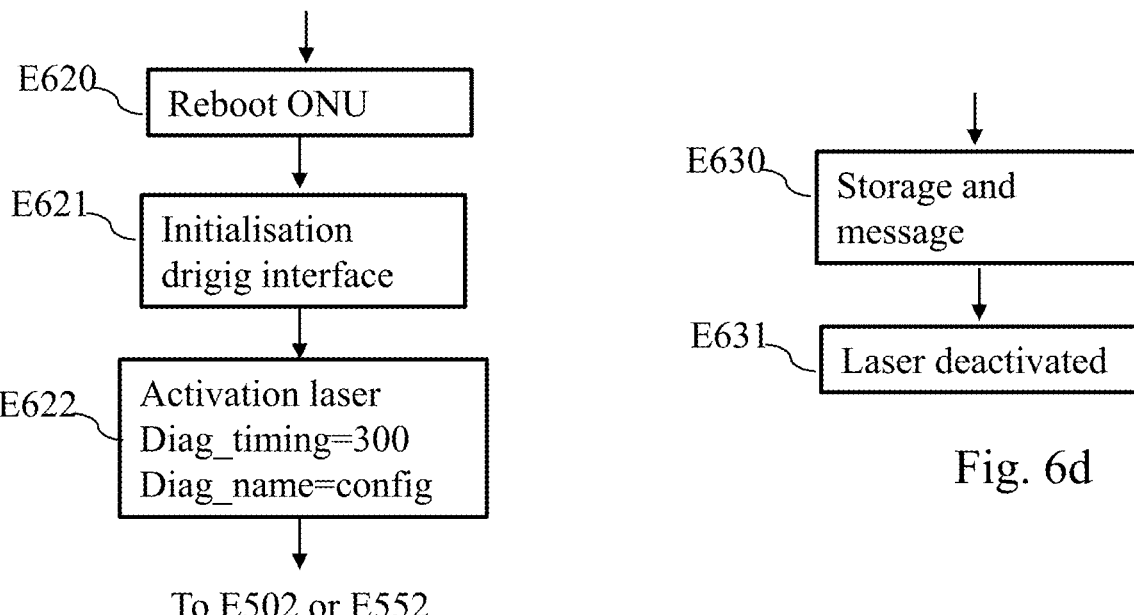
E620 — Reboot ONU
E621 — Initialisation drigig interface
E622 — Activation laser
Diag_timing=300
Diag_name=config
To E502 or E552
Fig. 6c
E630 — Storage and message
E631 — Laser deactivated
Fig. 6d

METHOD FOR MANAGING AN OPERATING FAULT IN A LASER DIODE

TECHNICAL FIELD

The present invention relates to a method for managing an operating fault in a laser diode in an optical access network of the passive optical network (PON) type, more particularly between optical line termination (OLT) equipment and an item of user equipment called "optical network unit" (ONU).

PRIOR ART

The distribution of numerical data by optical access network as far as a plurality of users, to access for example the internet, is implemented through an optical fibre medium. FTTH (standing for "Fibre to the Home" or FTTB ("Fibre to the Building") technology is spoken of. Thus several data transport systems can coexist on the same optical fibre, thus enabling a service operator to distribute several services through a reduced infrastructure. Passive optical networks PON can thus be created between one or more items of optical line termination equipment OLT and numerous items of user equipment ONU, by virtue of wavelength coupling devices and optical line coupling devices of users.

The various transport systems correspond to standardised hardware and protocols, for example the G-PON ("Gigabit Passive Optical Network") system, which makes it possible to achieve a rate of 2.5 Gbps in the downlink direction and a rate of 1.2 Gbps in the uplink direction, as described by ITU-T G.984, or the XG-PON ("eXtended Gigabit Passive Optical Network") system, which makes it possible to achieve a rate of 10 Gbps in the downlink direction and a rate of 2.5 Gbps in the uplink direction, as described by the ITU-T standard G.988, or the XGS-PON ("10 Gigabit-capable Symmetric Passive Optical Network") system, which makes it possible to achieve a rate of 10 Gbps in both the uplink and downlink directions, as described by the ITU-T standard G.9807.1.

The various transport systems coexist on one and the same optical fibre establishing communications by light signals using distinct carrier wavelengths (k) or carrier wavelength combs, whether in the uplink direction or in the downlink direction.

In order to ensure transport of the data to a plurality of ONUs connected to a single fibre and the emission wavelengths of which are identical, the Time-Division Multiple Access (TDMA) principle is used. This is a technique for controlling access to the medium making it possible to transmit several traffic flows over a single channel. It uses time division of the bandwidth, the principle of which is to distribute the time available between the various users. By this means, a wavelength can be allocated, in turn (almost simultaneously), to a plurality of subscribers. The interleaving is done on a set of bits transmitted in predefined time slots (TS). This multiplexing also makes it possible to pass synchronous or asynchronous flows over an asynchronous connection. Since the packets do not necessarily arrive in the order of transmission depending on the path taken, the role of the demultiplexer is then to reorder them and to separate the flows from the various channels so as to restore the information as it was before it was transported over the multiplexed network.

In the normal case of use, the ONU accesses the PON network and sends its transmission signal during a pre-defined dedicated time slot.

This transmission time window is defined by the OLT for each of the ONUs and transmitted to each of them over the downlink through the GTC (G-PON Traffic Control) messages sent at the start of each downlink frame. The ONUs are then obliged to respect the window allocated to them to transmit their next uplink frame.

Nevertheless, it is possible, in so-called fault conditions, that the ONU sends its transmission signal either continuously or outside its allocated time slot. This case is known by the term "rogue ONU".

Consequently, these other ONUs are unable to operate normally since they cannot be understood by the OLT. From a user point of view, the impact may range from a simple service disturbance to total interruption of all the internet services (data, IPTV, voice, etc).

In order to ensure quality of service at the network level, it is necessary to detect a fault of the rogue ONU type and to cut the related transmission signal. Currently, there exist methods for detecting and managing rogue ONU but these are initiated by the OLT. This is because the latter incorporates a rogue-ONU detection mechanism temporarily interrupting the service of all the ONUs connected if rogue is detected. Certainly, the OLT sends an instruction to the faulty ONU so that it cuts its transmission signal and thus to re-establish the service for all the other ONUs of the port, but this nevertheless causes service disturbance. The drawback of this current mechanism is that, if the faulty ONU restarts, a new disturbance takes place.

It is therefore desirable to overcome these drawbacks of the prior art.

It is in particular desirable to provide a solution that makes it possible to reduce the service disturbances for the ONUs connected to an optical fibre to which an ONU that sends its transmission signal during a time slot that is not dedicated to it is connected, or even to correct the operation of the ONU so that the latter sends its transmission signal solely during a time slot that is dedicated to it.

DISCLOSURE

A method is proposed for managing an operating fault in a laser diode of an optical interface of user equipment of the ONU type, the user equipment being connected by an optical access network of the passive optical network PON type to line termination equipment of the OLT type, the user equipment being enabled to transmit an optical signal during a time slot allocated to the user equipment in accordance with a time-division multiple access principle, characterised in that the method comprises the following steps, performed by the user equipment, of:

checking whether the laser diode is transmitting an optical signal outside the allocated time slot and, if so, detecting a fault, demanding deactivation of the laser diode, implementing one or more procedures for attempting to correct the fault.

One or more embodiments also relate to a device for managing an operating fault in a laser diode of an optical interface of user equipment of the ONU type, the user equipment being connected by an optical access network of the passive optical network PON type to line termination equipment of the OLT type, the user equipment being enabled to send an optical signal during a time slot allocated to the user equipment in accordance with a time-division multiple access principle, characterised in that the device is included in the user equipment and comprises:

means for checking whether the laser diode is transmitting an optical signal outside the allocated time slot and, if so, means for detecting a fault, means for demanding deactivation of the laser diode, means for implementing one or more procedures for attempting to correct the fault.

Thus, according to one or more embodiments, it is made possible to reduce the service disturbances for the ONUs connected to an optical fibre to which an ONU that sends its transmission signal solely during a time slot that is dedicated to it is connected. The gateway implementing one or more embodiments can thus attempt to correct the operation of the ONU so that the latter sends its transmission signal solely during a time slot that is dedicated to it.

According to one particular embodiment, the check whether the laser diode is transmitting an optical signal outside the allocated time slot is done by comparing a signal delivered by a photodiode included in the optical interface and a command to activate the laser diode transmitting optical signals to the line termination equipment, the photodiode being positioned so that it is illuminated by the signal emitted by the laser diode sending optical signals to the line termination equipment.

According to a particular embodiment, a first procedure for attempting to correct the fault consists of a reinitialization of a volatile memory used by a driver of the optical interface, a second procedure for attempting to correct the fault consists of a command to load the software used by the driver from the non-volatile memory, and a third procedure for attempting to correct the fault consists of a rebooting of the user equipment.

According to one particular embodiment, the second procedure for attempting to correct the fault is implemented if the first procedure for attempting to correct the fault has failed and the third procedure for attempting to correct the fault is implemented if the second procedure for attempting to correct the fault has failed.

According to one particular embodiment, the method furthermore comprises a step of transferring a message to the line termination equipment if the fault is detected.

According to one particular embodiment, the implementation of one or more procedures for attempting to correct the fault is dependent on the reception of a message sent by the line termination equipment.

According to one particular embodiment, the message is transmitted over a logic traffic-control communication channel.

According to one particular embodiment, the message is a notification of a request to await a procedure for banishing the user equipment by the line termination equipment.

A computer program, which can be stored on a medium and/or downloaded from a communication network, in order to be read by a processor, is also proposed. This computer program comprises instructions for implementing the method implemented by an internet gateway as mentioned above, when said program is executed by the processor. One or more embodiments also relate to an information storage medium storing such a computer program.

BRIEF DESCRIPTION OF THE DRAWINGS

The features mentioned above, as well as others, will emerge more clearly from the reading of the following description of at least one example embodiment, said description being made in relation to the accompanying drawings, among which:

FIG. 6*a* illustrates schematically a first example of an algorithm for attempting to correct the operation of the ONU so that the latter sends its transmission signal solely during a time slot that is dedicated to it;

FIG. 6*b* illustrates schematically a second example of an algorithm for attempting to correct the operation of the ONU so that the latter sends its transmission signal solely during a time slot that is dedicated to it;

FIG. 6*c* illustrates schematically a third example of an algorithm for attempting to correct the operation of the ONU so that the latter sends its transmission signal solely during a time slot that is dedicated to it;

FIG. 6*d* illustrates schematically an example of an algorithm executed when the attempts at correcting the operation of the ONU have failed.

DETAILED DISCLOSURE OF EMBODIMENTS

Figure 1:
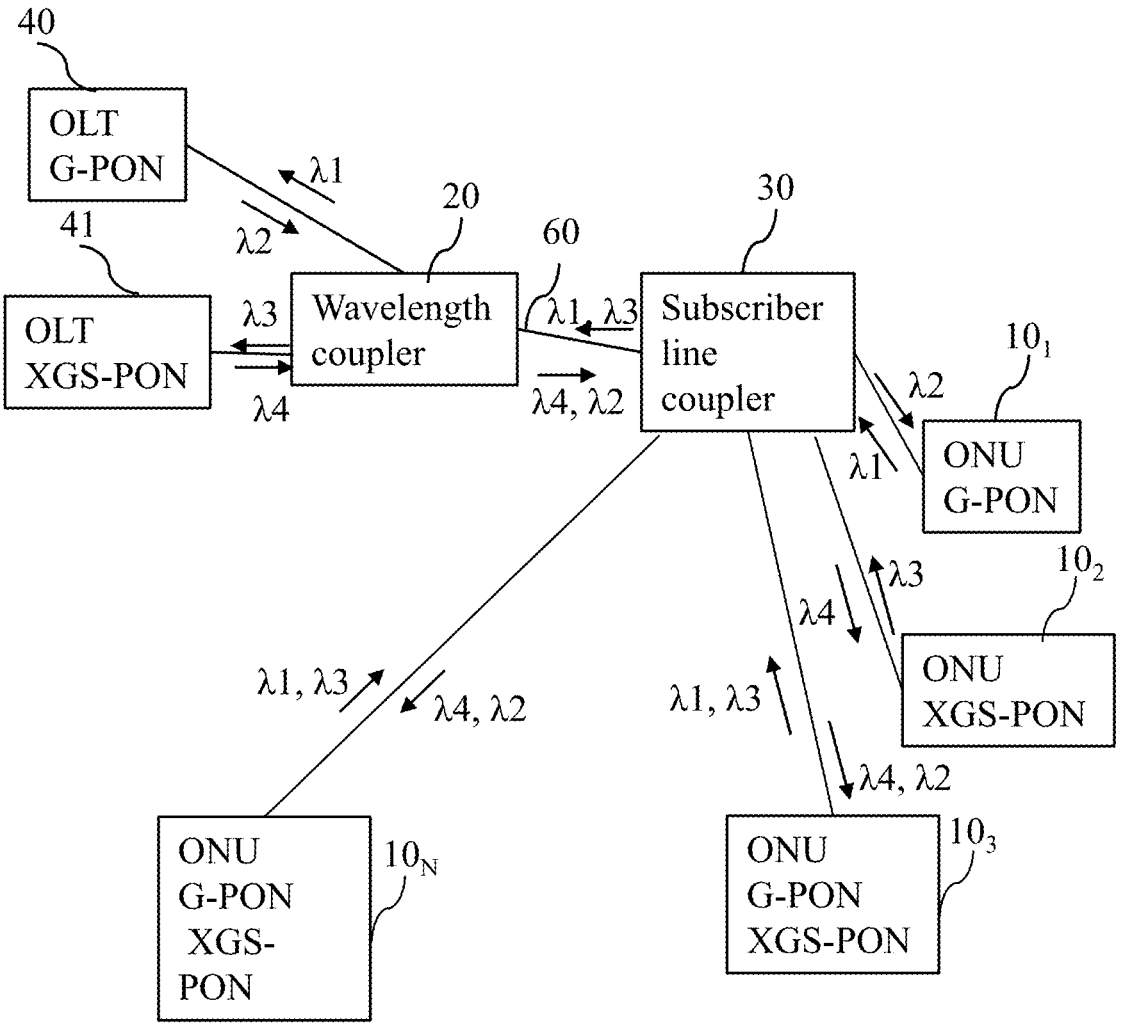
FIG. 1 illustrates schematically an arrangement of an optical access network wherein a particular non-limitative embodiment can be implemented.

FIG. 1 illustrates schematically an arrangement of an optical access network of the PON type wherein one or more embodiments can be implemented.

The optical access network comprises an item of G-PON optical line termination equipment OLT 40 as complying with the ITU-T standard G.984 and an item of XGS-PON optical line termination equipment OLT 41 as complying with the ITU-T standard G.9807.1.

The G-PON optical line termination equipment OLT 40 transmits an optical signal having a wavelength 12 and receives an optical signal having a wavelength 21.

The XGS-PON optical line termination equipment OLT 41 sends an optical signal having a wavelength λ4 and receives an optical signal having a wavelength λ3.

The optical access network comprises for example N optical network units ONU on FIG. 1. In an example of one of the embodiments, an ONU can be included in an internet gateway. In another example of one of the embodiments, an ONU is an individual or autonomous device. This individual device can be associated with or cooperate with an internet gateway, such as a residential internet gateway, or can cooperate with another device of a network in order to distribute therein the data received by the OLT.

In one example, the optical network unit ONU is included in the internet gateway $10_1$ and complies with the ITU-T standard G.984, the optical network unit ONU included in the internet gateway $10_2$ complies with the ITU-T standard G.9807.1, the optical network unit ONU included in the internet gateway $10_3$ complies with the ITU-T standards G.984 and G.9807.1 and the optical network unit ONU $10_N$ is an individual device and complies with ITU-T standards G.984 and G.9807.1.

The optical network unit ONU included in the internet gateway $10_1$ transmits an optical signal having a wavelength $\lambda 1$ and receives an optical signal having a wavelength $\lambda 2$, and the optical network unit ONU included in the internet gateway $10_2$ transmits an optical signal having a wavelength $\lambda 3$ and receives an optical signal having a wavelength $\lambda 4$.

The optical network unit ONU included in the internet gateway $10_3$ receives optical signals having a wavelength $\lambda 4$ or 12 and transmits optical signals having a wavelength $\lambda 1$ or $\lambda 3$.

The optical network unit ONU included in the internet gateway $10_N$ receives optical signals having a wavelength $\lambda 4$ or $\lambda 2$ and transmits optical signals having a wavelength $\lambda 1$ or $\lambda 3$.

The optical access network comprises a wavelength coupling device 20 for coupling two other optical lines to the optical fibre 60. These other optical lines enable the optical line termination equipment OLT 40 and 41 to coexist in the optical access network.

It should be noted here that, in some operating cases, it may be advantageous to combine the equipment 40, 41 and 20 in a combined item of equipment called ONT combo that takes responsibility for the global operation of the two G-PON and XGS-PON protocols.

The optical access network comprises a subscriber-line coupling device 30.

The coupling devices 20 and 30 can for example be wavelength selective switches WSS adapted for multiplexing wavelengths in one direction and demultiplexing wavelengths in the opposite direction, or be simple couplers, since both the OLTs and the ONUs are able to separate by themselves the various wavelengths. This is because, being equipped with a monochromatic laser diode and having a selective filter, both the OLTs and the ONUs can receive solely the signals carried by the wavelength that concerns them.

Figure 2:
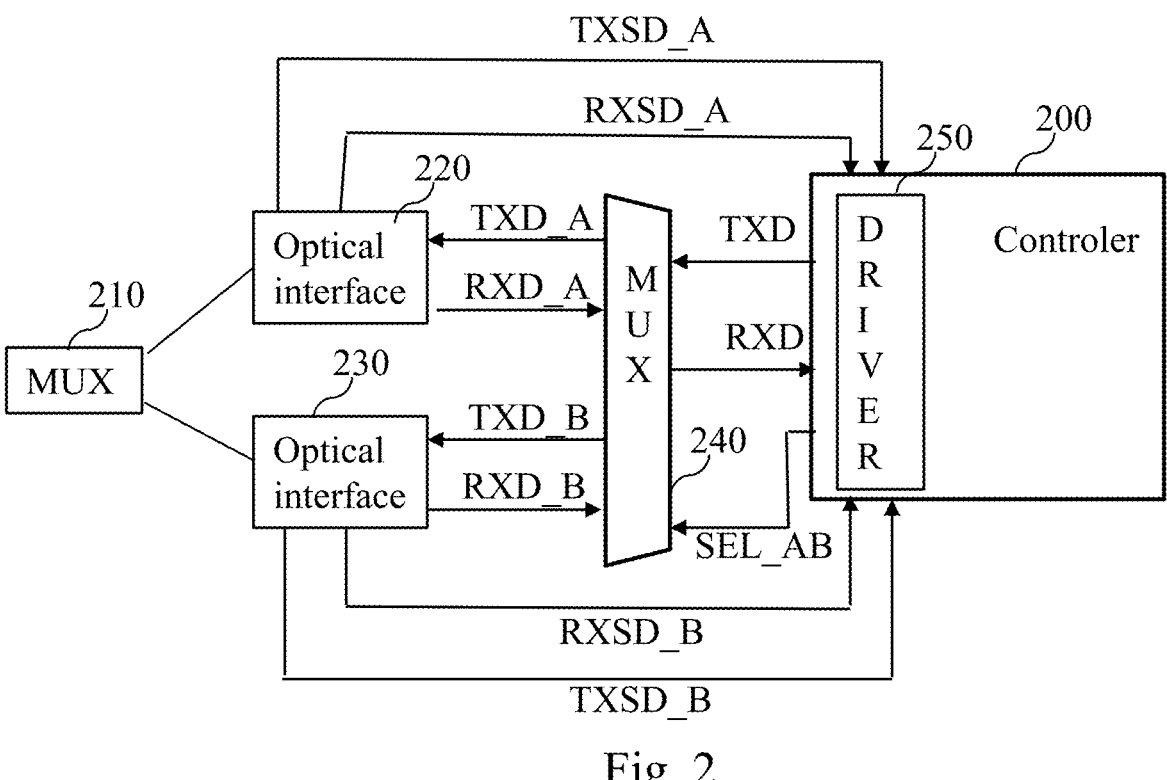
FIG. 2 illustrates schematically an embodiment of user equipment of the optical access network.

FIG. 2 illustrates schematically an embodiment of user equipment of the optical access network.

The user equipment of the optical access network is for example the ONU included in the internet gateway $10_3$ or is the ONU $10_N$.

The ONU equipment comprises an optical coupling, not shown in FIG. 2, to which the optical fibre is connected, making it possible to connect the ONU equipment to the rest of the optical access network.

The ONU equipment furthermore comprises a wavelength multiplexer/demultiplexer MUX for combining and respectively separating the optical signals carried by the optical fibre plugged into the optical coupling.

Illustratively, on FIG. 2, the ONU equipment comprises two branches (220 and 230). Each branch supports a transmission direction (TX) and a reception direction (RX), each having its own carrier wavelength or a comb of its own carrier wavelengths.

It should be noted that one and the same branch can support a plurality of protocols and therefore a plurality of transport systems. When a plurality of transport systems use the same carrier wavelengths in the optical access network, the use of these carrier wavelengths is shared timewise between the transport systems in accordance with a time division access TDMA principle.

Thus it should also be noted that FIG. 2 shows two branches illustratively and that the ONU equipment may therefore comprise a different number of branches.

The ONU equipment comprises a controller 200 that comprises a driver 250 that controls the optical-electrical interfaces 220 and 230.

Optical-electrical interfaces 220 and 230 each comprising a laser diode (for the transmission TX of optical signals intended for the OLT) and a photodiode (for the reception RX of the signals coming from the OLT) make it possible to convert optical signals into electrical signals and vice versa.

According to one embodiment, each optical-electrical interface 220 and 230 furthermore comprises a photodiode that makes it possible to indicate whether the laser diode is transmitting an optical signal, as will be described with reference to FIG. 4.

For example, the optical-electrical interfaces 220 and 230 are architectures around components from the company "MACOM" marketed under the name MO2099. These components make it possible to implement a mechanism for monitoring the laser diode.

For example, by comparing the request to transmit an optical signal coming from the controller and the state of the laser diode detected by the photodiode, it is possible to determine whether the laser diode is transmitting an optical signal outside the allocated time slot. The signal TXSD_A or TXSD_B supplies to the driver 250 the state detected by the photodiode, and the driver 250 or the controller 200 determines whether its laser diode is transmitting an optical signal outside the allocated time slot.

If a transmission activity is detected whereas the explicit request coming from the processor is not active, then the laser diode is transmitting an optical signal outside the allocated time slot.

When the ONU equipment comprises a plurality of branches, the ONU equipment furthermore comprises an electrical-signal switch 240. The branch to be used is selected by the controller 200 by means of a selection line SEL_AB.

Thus, when the branch A is selected by the controller 200 and optical signals are detected in reception on the branch A, the optical-electrical interface 220 informs the controller 200 of this by means of a signal RXSD_A. The electrical-signal switch 240 is then configured to route signals present on a signal line RXD_A coming from the optical-electrical interface 220 to the controller 200. In addition, when optical signals are to be transmitted by means of the branch A, the electrical-signal switch 240 is configured to route signals present on a signal line TXD coming from the controller 200 to a signal line TXD_A at the input of the optical-electrical interface 220.

Similarly, when the branch B is selected by the controller 200 and optical signals are detected in reception on the branch B, the optical-electrical interface 230 informs the controller 200 of this by means of a signal RXSD_B. The electrical-signal switch 240 is then configured to route signals present on a signal line RXD_B coming from the optical-electrical interface 230 to the signal line RXD. In addition, when optical signals are to be transmitted by means of the branch B, the electrical-signal switch 240 is configured to route signals present on the signal line TXD to a signal line TXD_B at the input of the optical-electrical interface 230.

Figure 3:
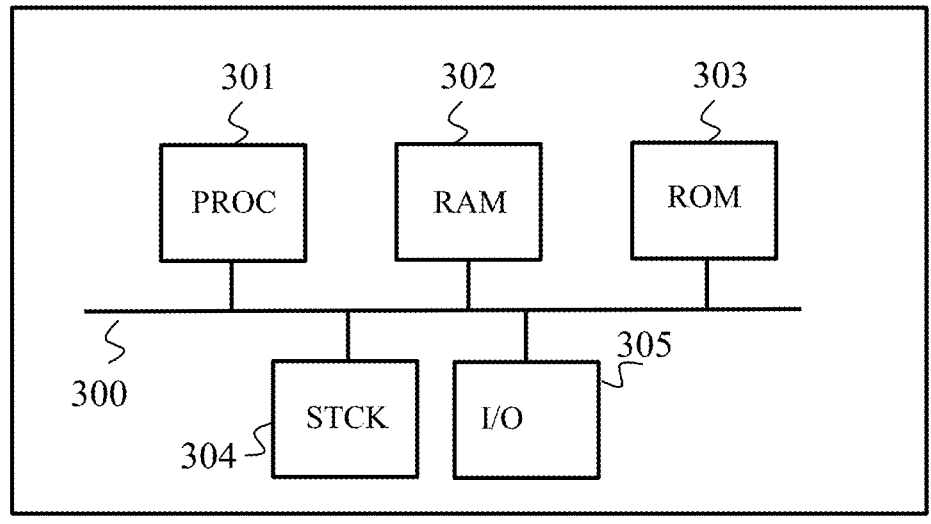
FIG. 3 illustrates schematically an example of hardware arrangement of a controller of the user equipment of the embodiment in FIG. 2.

FIG. 3 illustrates schematically an example of hardware arrangement of the controller 200 The example of hardware arrangement presented comprises, connected by a communication bus 300: a processor or CPU 301; a random access memory (RAM) 302; a read only memory (ROM) 303 or a flash memory; a storage unit or a storage medium reader, such as an SD (Secure Digital) card reader 304 or a hard disk drive (HDD); and at least one set of inputs/outputs I/O 305, in particular for connecting the signal lines TXD and RXD.

The processor CPU 301 is capable of executing instructions loaded in the RAM 302 from the ROM 303, from an external memory (such as an SD card), from a storage medium (such as the hard disk HDD), or from a communication network (other than the optical access network 100). When the controller 200 is powered up, the processor CPU 301 is capable of reading instructions in the RAM 302 and executing them. These instructions form a computer program causing the implementation, by the processor CPU 301, of all or some of the behaviours, algorithms and steps described here.

Thus all or some of the algorithms and steps described here can be implemented in software form by executing a set of instructions by a programmable machine, such as a DSP ("digital signal processor"), or a microcontroller or a processor. All or some of the algorithms and steps described here can also be implemented in hardware form by a machine or a component (chip), such as an FPGA ("field-programmable gate array"), or an ASIC ("application-specific integrated circuit"). Thus the controller 200 comprises electronic circuitry adapted and configured to implement the behaviours, algorithms and steps described here.

Figure 4:
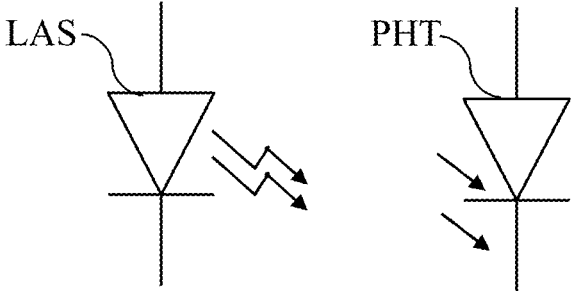
FIG. 4 illustrates schematically a part of an optical interface of the user equipment of the embodiment in FIG. 2.

FIG. 4 illustrates schematically a part of an optical interface of the user equipment of the embodiment in FIG. 2.

As mentioned previously, each optical-electrical interface 220 and 230 comprises a photodiode PHT that makes it possible to indicate whether the laser diode LAS is transmitting an optical signal. The photodiode PHT is positioned so that it is illuminated by the signal emitted by the laser diode LAS.

Figure 5A:
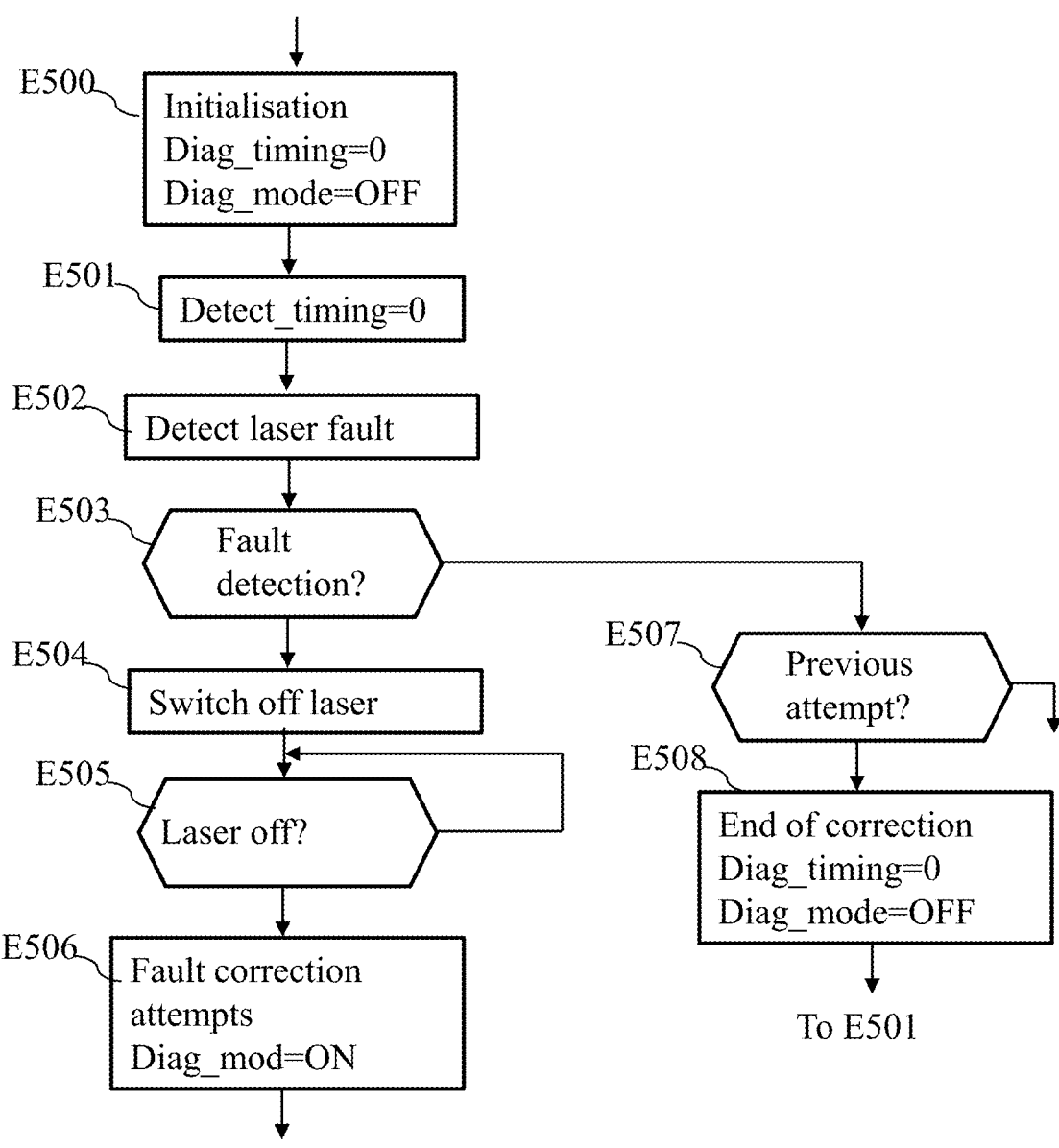
FIG. 5*a* illustrates schematically a first example of an algorithm executed by the user equipment.

FIG. 5a illustrates schematically a first example of an algorithm executed by the user equipment.

At the step E500, the user equipment initialises the variable denoted Diag_timing to the value zero and the variable denoted Diag_mode to the value "OFF".

At the step E501, the user equipment launches the procedure for checking whether each laser diode LAS is transmitting an optical signal only in the predefined dedicated time slot and sets the variable Detect_timing to the value zero.

At the step E502, the user equipment compares the signal TXSD_A or TXSD_B with the request to activate the laser diode LAS coming from the controller 200.

For example, when the signal TXSD_A or TXSD_B is at the high level, the laser diode LAS transmits an optical signal.

If the signal TXSD_A or TXSD_B is at the high level in a time slot different from the time slot for activating the laser diode LAS requested by the controller 200, the laser diode transmits an optical signal outside the allocated time slot and a fault is detected.

At the step E503, the user equipment checks whether a fault is detected.

If a fault is detected, the user equipment passes to the step E504. If not, the user equipment passes to the step E507.

At the step E504, the user equipment demands deactivation of the laser diode for which the fault has been detected.

At the step E505, the user equipment checks whether the signal TXSD_A or TXSD_B is at the low level, i.e whether the laser diode is not transmitting an optical signal.

If so, the user equipment passes to the step E506. If not, the user equipment interrupts the present algorithm.

At the step E506, the user equipment demands implementation of one or more procedures for attempting to correct the fault and sets the variable Diag_mod to the value "ON".

At the step E507, the user equipment checks whether the variable Diag_mod is at the value "ON" and whether the value of the variable Detect_timing is higher than the value of the variable Diag_timing. This check indicates whether a fault-correction attempt has succeeded.

If not, it has not been necessary to make an attempt to correct a fault. If so, a fault-correction attempt has succeeded and the user equipment passes to the step E508.

At the step E508, the user equipment interrupts the fault-correction attempt procedure and sets the variable Diag_timing to the value zero and the variable denoted Diag_mode to the value "OFF". In a particular embodiment, the user equipment stores an identifier of the fault-correction attempt that made it possible to correct the fault in the eventuality of implementing it as a priority if a new fault came to be detected subsequently. The user equipment next returns to the step E501.

Figure 5B:
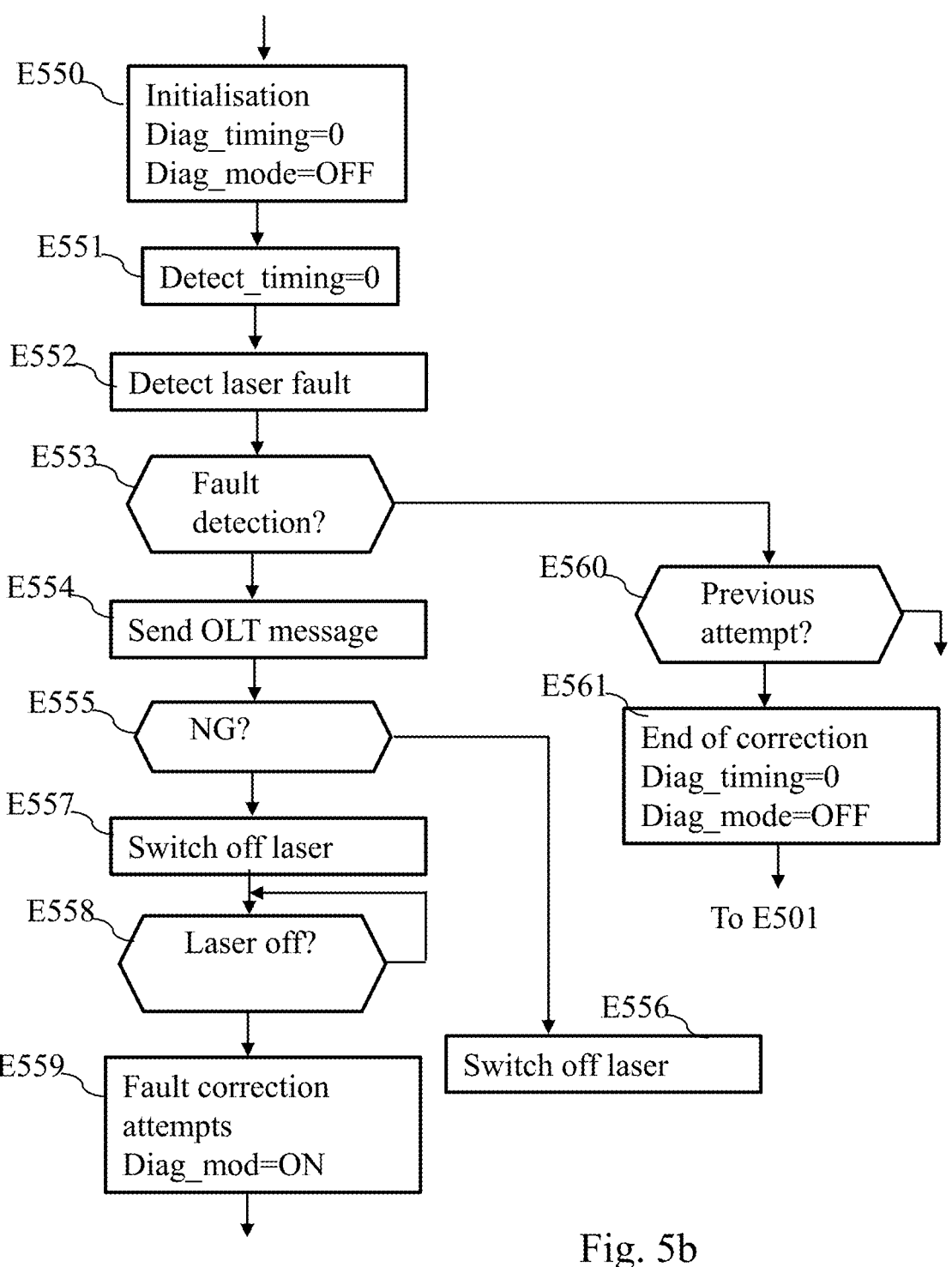
FIG. 5*b* illustrates schematically a second example of an algorithm executed by the user equipment.

FIG. 5b illustrates schematically a second example of an algorithm executed by the user equipment.

At the step E550, the user equipment initialises the variable denoted Diag_timing to the value zero and the variable denoted Diag_mode to the value "OFF".

At the step E551, the user equipment launches the procedure for checking whether each laser diode LAS is transmitting an optical signal only in the predefined dedicated time slot and sets the variable Detect_timing to the value zero.

At the step E552, the user equipment compares the signal TXSD_A or TXSD_B with the request to activate the laser diode LAS coming from the controller 200.

For example, when the signal TXSD_A or TXSD_B is at the high level, the laser diode LAS transmits an optical signal.

If the signal TXSD_A or TXSD_B is at the high level in a time slot different from the time slot for activating the laser diode LAS requested by the controller 200, the laser diode transmits an optical signal outside the allocated time slot and a fault is detected.

At the step E553, the user equipment checks whether a fault is detected.

If a fault is detected, the user equipment passes to the step E554. If not, the user equipment passes to the step E560.

At the step E554, the user equipment demands the sending of a message to the standard line termination equipment to which it is connected.

The user equipment sends for example a PON message specific to the line termination equipment to which it is connected over the GTC (G-PON Traffic Control) logic communication channel in order to notify that a laser fault is detected and that the user equipment is launching the execution of fault-correction attempts.

The uplink GTC logic communication channel is still active in the great majority of cases since, fairly generally, the data transmission function is functioning correctly, but the driver does not manage to cut the optical signal transmission outside the time slot. The user equipment transmits the PON message in the time slot that is allocated to it.

In the minority of cases where the fault is more serious, the line termination equipment will not be able to understand the specific message transmitted.

Example, in the case of the G-PON protocol based on the ITU-T standard G.984.3, it is possible for the ONU to communicate control information to the OLT by means of the PLOAM messages defined in Chapter 9 of the ITU-T standard G.984.3. The Physical_Equipment_Error (PEE) (code 0x06) upstream message is an example of a message that can be used for signalling an operating fault to the line termination equipment.

The arguments of the Physical_Equipment_Error upstream message, in particular bytes 3 to 12, comprise a specific value showing the characteristic of the error diagnosed by the user equipment and which is the subject of a correction attempt.

The message transferred is for example a simple preventive notification and a temporary pausing of the banishing procedure conventionally used by the line termination equipment. For example, the message comprises a predetermined identifier lying between 0x0A and 0xFF and having as argument a delay in processing by the user equipment of the fault-connection attempt, for example in the form of a duration in seconds as from which the user equipment will once again attempt to communicate, at the risk of causing a new error.

At the step E555, the user equipment checks whether a message rejecting the fault-correction attempt is received from the standard line termination equipment to which it is connected.

If so, the user equipment passes to the step E556 and demands deactivation of the laser diode for which the fault has been detected. If not, the user equipment passes to the step E557.

At the step E557, the user equipment demands deactivation of the laser diode for which the fault has been detected.

At the step E558, the user equipment checks whether the signal TXSD_A or TXSD_B is at the low level, i.e whether the laser diode is not transmitting an optical signal.

If so, the user equipment passes to the step E559. If not, the user equipment interrupts the present algorithm.

At the step E559, the user equipment demands implementation of one or more fault-correction attempt procedures and sets the variable Diag_mod to the value "ON", as described with reference to FIGS. 6*a* to 6*d*.

For example, the order of implementation of the fault-correction attempt procedures is the implementation firstly of FIG. 6*a*, and then, in the case of failure of the fault correction, implementation of FIG. 6*b*, and then, in the case of failure of the fault correction, implementation of FIG. 6*c*, and then, in the case of failure of the fault correction, implementation of FIG. 6*d*.

It should be noted here that the order of implementation of the fault-correction attempt procedures is modifiable and/or that only some of the fault-correction attempt procedures as described with reference to FIGS. 6*a* to 6*d* are implemented.

At the step E560, the user equipment checks whether the variable Diag_mod is at the value "ON" and whether the value of the variable Detect_timing is higher than the value of the variable Diag_timing. This check indicates whether a fault-correction attempt has succeeded.

If not, it has not been necessary to make an attempt to correct a fault. If so, a fault-correction attempt has succeeded and the user equipment passes to the step E561.

At the step E561, the user equipment interrupts the fault-correction attempt procedure and sets the variable Diag_timing to the value zero and the variable denoted Diag_mode to the value "OFF". In a particular embodiment, the user equipment stores an identifier of the fault-correction attempt that made it possible to correct the fault in the eventuality of implementing it as a priority if a new fault came to be detected subsequently. The user equipment next returns to the step E551.

FIG. 6*a* illustrates schematically a first example of an algorithm for attempting to correct the operation of the ONU so that the latter sends its transmission signal solely during a time slot that is dedicated to it.

The user equipment executes the present algorithm when the variable Diag_mod is at the value "ON" and the variable Diag_name is not at the value "STACK" or "BACKUP" or "REBOOT".

At the step E600, the user equipment demands reinitialization of the component driving the PON protocol layer (for example G-PON and/or XGS-PON and/or XG-PON etc) used by the driver 250. This component driving the PON protocol layer may be a software component, or a hardware component, or a mixture of software and hardware elements, coupled with the PON interface.

At the step E601, the user equipment enables activation of the laser diode in the time slot dedicated to the user equipment, sets the variableDiag_timing to the value 300, and sets the value of the variable Diag_name to the value "STACK". The value 300 is decremented at each second and, when the value of the variable Diag_timing is zero, the user equipment returns to the step E502 or E552.

FIG. 6*b* illustrates schematically a second example of an algorithm for attempting to correct the operation of the ONU so that the latter sends its transmission signal solely during a time slot that is dedicated to it.

The user equipment executes the present algorithm when the variable Diag_mod is at the value "ON" and the variable Diag_name is at the value "STACK".

At the step E610, the user equipment demands loading of the software used by the driver 250 from the non-volatile memory.

At the step E611, the user equipment demands reinitialization of the component driving the PON protocol layer used by the driver 250.

At the step E612, the user equipment enables activation of the laser diode in the time slot dedicated to the user equipment, sets the variable Diag_timing to the value 300, and sets the value of the variable Diag_name to the value "CONFIG". The value 300 is decremented at each second and, when the value of the variable Diag_timing is zero, the user equipment returns to the step E502 or E552.

FIG. 6*c* illustrates schematically a third example of an algorithm for attempting to correct the operation of the ONU so that the latter sends its transmission signal solely during a time slot that is dedicated to it.

The user equipment executes the present algorithm when the variable Diag_mod is at the value "ON" and the variable Diag_name is at the value "CONFIG".

At the step E620, the user equipment demands rebooting thereof.

At the step E621, the user equipment demands reinitialization of the component driving the PON protocol layer used by the driver 250.

At the step E622, the user equipment enables activation of the laser diode in the time slot dedicated to the user equipment, sets the variable Diag_timing to the value 300, and sets the value of the variable Diag_name to the value "REBOOT". The value 300 is decremented at each second and, when the value of the variable Diag_timing is zero, the user equipment returns to the step E502 or E552.

FIG. 6*d* illustrates schematically an example of an algorithm executed when the attempts at correcting the operation of the ONU have failed.

The user equipment executes the present algorithm when the variable Diag_mod is at the value "ON" and the variable Diag_name is at the value "REBOOT".

At the step E630, the user equipment considers that the fault-correction attempts have failed, stores information indicating that each attempt has failed and generates information representing the operating fault of the optical link by means of a man-machine interface of the internet gateway.

The invention claimed is:

1. A method for managing an operating fault in an optical interface of user equipment of the ONU type, the user equipment being connected by an optical access network of the passive optical network PON type to line termination equipment of the OLT type, the user equipment being enabled to transmit an optical signal during a time slot allocated to the user equipment in accordance with a time-division multiple access principle, wherein the method comprises the following steps, performed by the user equipment, of:

checking whether a laser diode of the optical interface is transmitting an optical signal outside the allocated time slot and, if so, detecting a fault and transferring a message to the line termination equipment if the fault is detected, the message is transmitted over the traffic-control logic communication channel and being a notification of a request to await a procedure for banishing the user equipment by the line termination equipment, demanding deactivation of the laser diode, implementing one or more procedures for attempting to correct the fault.

2. The method according to claim 1, wherein the check that the laser diode is transmitting an optical signal outside the allocated time slot is done by comparing a signal delivered by a photodiode included in the optical interface and a command to activate the laser diode transmitting optical signals to the line termination equipment, the photodiode being positioned so that it is illuminated by the signal transmitted by the laser diode transmitting optical signals to the line termination equipment.

3. The method according to claim 1, wherein the first procedure for attempting to correct the fault comprises a reinitialization of a volatile memory used by a component driving the PON protocol layer by a driver of the optical interface, a second procedure for attempting to correct the fault comprises a command to load the software used by the driver from the non-volatile memory, and a third procedure for attempting to correct the fault comprises a rebooting of the user equipment.

4. The method according to claim 3, wherein the second procedure for attempting to correct the fault is implemented if the first procedure for attempting to correct the fault has failed and the third procedure for attempting to correct the fault is implemented if the second procedure for attempting to correct the fault has failed.

5. The method according to claim 1, wherein the implementation of one or more procedures for attempting to correct the fault is dependent on the reception of a message sent by the line termination equipment.

6. A non-transitory information storage medium storing a computer program comprising instructions for implementing, by a processor, the method according to claim 1, when said program is read and executed by said processor.

7. A device for managing an operating fault of an optical interface of user equipment of the ONU type, the user equipment being connected by an optical access network of the passive optical network PON type to line termination equipment of the OLT type, the user equipment being enabled to send an optical signal during a time slot allocated to the user equipment in accordance with a time-division multiple access principle, wherein the device is included in the user equipment and comprises electronic circuitry configured for:

checking whether a laser diode of the optical interface is transmitting an optical signal outside the allocated time slot and, if so, detecting a fault and transferring a message to the line termination equipment if the fault is detected, the message is transmitted over the traffic-control logic communication channel and being a notification of a request to await a procedure for banishing the user equipment by the line termination equipment, demanding deactivation of the laser diode, and implementing one or more procedures for attempting to correct the fault.

* * * * *